(12) United States Patent
Newman

(10) Patent No.: US 8,386,826 B2
(45) Date of Patent: Feb. 26, 2013

(54) SYSTEM AND METHOD FOR MANAGING POWER OF A PORTABLE DEVICE

(75) Inventor: Nader Newman, Brampton (CA)

(73) Assignee: Psion Inc., Mississauga, Ontario (CA)

( * ) Notice: Subject to any disclaimer, the term of this patent is extended or adjusted under 35 U.S.C. 154(b) by 378 days.

(21) Appl. No.: 12/766,120

(22) Filed: Apr. 23, 2010

(65) Prior Publication Data

US 2011/0264944 A1    Oct. 27, 2011

(51) Int. Cl.
*G06F 1/00*    (2006.01)
*G06F 1/32*    (2006.01)

(52) U.S. Cl. ........ 713/340; 713/100; 713/300; 713/320; 713/323

(58) Field of Classification Search .................. 713/100, 713/300, 320, 323, 340
See application file for complete search history.

(56) References Cited

U.S. PATENT DOCUMENTS

| | | | |
|---|---|---|---|
| 2008/0168267 A1* | 7/2008 | Bolen et al. | 713/100 |
| 2010/0106994 A1* | 4/2010 | Challener et al. | 713/330 |
| 2010/0115259 A1* | 5/2010 | Elsila et al. | 713/100 |
| 2011/0018346 A1* | 1/2011 | Dixon | 307/39 |
| 2011/0126033 A1* | 5/2011 | Springfield et al. | 713/320 |

* cited by examiner

*Primary Examiner* — Vincent Tran

(57) ABSTRACT

A method and system for managing power of a portable device is disclosed. The portable devices has a plurality device components that has controllable power settings. The device has a plurality of power profiles, each power profile referencing a list of the available device components that are configured for adequate power needs. Set of rules are then defined having a criterion for executing the plurality of power profiles, where the criterion is based on a device input. Once the rules and power profiles are created, the device inputs are monitored to determine if there is a match. If the criteria in the rules are matched, the corresponding power profile is executed to maximize battery life.

24 Claims, 11 Drawing Sheets

GPS Rules  72

- (Rule #1) if device is in range of coordinates 1 and coordinates 2, then enable defined profile 1.

- (Rule #2) if device is in range of coordinates 1 and coordinates 2, then enable defined profile 1, else enable defined profile 2.

RFID Rules  76

- (Rule #1) if tag data equals defined data 1, then enable defined profile 1.

- (Rule #2) if tag data equals defined data 1, then enable defined profile 1, or if tag data equals defined data 2, then enable defined profile 2.

Wi-Fi™ Rules  74

- (Rule #1) if IP subnet equals 10.128.0.0, then enable defined profile 1.

- (Rule #2) if IP subnet equals 10.128.0.0, then enable defined profile 1, else enable defined profile 2.

- (Rule #3) if IP subnet equals 10.128.0.0, then enable defined profile 1, or if IP subnet equals 10.64.0.0, enable defined profile 2.

Dock Rules  78

- (Rule #1) if device is docked, then enable defined profile 1, else enable defined profile 2.

Monday-to-Friday Rules 80

-(Rule #1) if time equals 9:00AM, then enable *Morning Drive Profile*.

-(Rule #2) if time equals 9:30AM or 1:00PM, then enable *Office Profile*.

-(Rule #3) if time equals 12:00PM, then enable *Lunch Profile*.

-(Rule #4) if time equals 5:00PM, then enable *Drive home Profile*.

Monday-to-Friday Rules 82

-(Rule #1) if (time between 8:00AM and 9:30AM) and (GPS location not equals *home* or *office*), then enable *Morning Drive Profile*.

-(Rule #2) if (time between 9:30AM and 12:00PM, or between 1:00PM and 5:00PM) and (GPS location equals *office*), then enable *Office Profile*.

-(Rule #3) if time between 12:00PM and 1:00PM, then enable *Lunch Profile*.

FIG. 10

Warehouse Scanner 1 Rules 84

- (Rule #1) if GPS location equals *warehouse*, then enable *Warehouse Profile*.

- (Rule #2) if GPS location equals *office*, then enable *Office Profile*.

- (Rule #3) if (GPS location not equals *office* or *warehouse*) AND (time between 8:00AM and 5:00PM), then enable *Day-time Delivery Profile*.

- (Rule #4) if (GPS location not equals *office* or *warehouse*) AND (time between 5:00PM and 10:00PM), then enable *Night-time Delivery Profile*.

Inactivity Rules 86

- (Rule #1) if inactivity timer greater than or equal to *30s*, then enable *Profile 1*.

- (Rule #2) if inactivity timer greater than or equal to *1 min*, then enable *Profile 2*.

- (Rule #3) if inactivity timer greater than or equal to *5 min*, then enable *Profile 3*.

FIG. 11

SYSTEM AND METHOD FOR MANAGING POWER OF A PORTABLE DEVICE

FIELD OF INVENTION

The present invention relates to power management, more specifically, the present invention relates to managing power for a portable device.

BACKGROUND OF THE INVENTION

It was not too long ago that cell phones became a common household item. In those days, cell phones were mainly used for making phone calls and storing contact information. In the last few years, the rapid advancement in mobile computing platforms gave birth to a new breed of phones, namely "smartphones". These phones pack many different features ranging from having the ability to browse the Internet to being able to play multiplayer games. The growth of features is not limited to consumer "smartphones"; mobile devices for use in business environments have benefited from the advancement in mobile computing, as compact and powerful handheld devices have replaced bulky equipments while providing more advanced features. Such features include, for example, Radio-Frequency Identification (RFID) to manage inventory electronically, Wi-Fi™ to enable the exchange of information wirelessly, and Bluetooth™ to provide the handheld users unobstructed movement. These mobile devices render businesses more efficient, competitive and environmentally friendly.

With ever increasing demand for more advanced features in compact form, power requirements for mobile devices have increased as well. However, battery technologies have not kept pace with the power requirements of modern mobile devices. Thus, mobile device manufacturers are looking for ways to conserve power. At first, laptop manufacturers provided two modes of operation: AC power and battery power. The first mode enabled all the components of the laptop to be fully functional when the laptop was plugged into a wall socket. The second mode significantly restricted the mode of operation of a laptop to maximize battery life when the laptop was not plugged into a wall socket.

More recently, a consortium of software and hardware developers have developed a standard known as Advanced Configuration and Power Interface (ACPI) to provide an open-standard for managing and configuring power of a device. This movement has allowed software and hardware developers to control the power states of each ACPI-compliant hardware. For example, in Microsoft™ Windows™, users are able to create different "power profiles" that suit different environment settings. Through these power profiles, a user is able to vary the power requirement of a device in different settings. For example, a user using a mobile device (e.g. a laptop) at home is typically plugged into a wall socket or is very close to a wall socket. Thus, the user is less concerned about power optimization. However, if the same user is on a bus commuting to work, power optimization is a big concern since a wall socket is not available. In Windows™, to differentiate between these two environments, the user is able to create different power profiles that vary the power usage of each components of the mobile device. By creating a profile for "home" and another for "commute", the user is able to vary the power requirements for each settings. However, existing power management schemes rely on the user to recognize the different power needs and set them as required. Referring back to our example, the user would have to manually set the power profiles to "home" when the user arrives at home and change to "commute" when the user leaves home. Currently, there is no method of managing power profiles autonomously once specific parameters are defined. Therefore, there is a need for a power management technique that is managed autonomously once specific parameters are set by the user.

SUMMARY OF THE INVENTION

According to an aspect of the present invention there is provided a method for managing power of a portable device, the portable device having a plurality of device components, including a processor and memory, each device component having a controllable power setting. The method includes: creating a plurality of power profiles in the memory, each power profile referencing the plurality of device components; configuring the controllable power setting of each device component referenced in each power profile; creating a rule having a criterion for executing the plurality of power profiles, the criterion based on a device parameter; configuring the rule for executing the plurality of power profiles; monitoring the device parameter to determine if the criterion in the rule used to manage power of the portable device is matched; and executing on the processor the plurality of power profiles if the criterion in the rule is matched.

According to another aspect of the present invention, there is provided a system for managing power of a portable device, the portable device having a plurality of device components, including a processor and a memory, each device component having a controllable power setting. The system includes: a power profile creator module for creating a plurality of power profiles and storing the plurality of power profiles in the memory, each power profile referencing the plurality of device components; a power profile configurator module for configuring the controllable power setting of each device component referenced in each power profile; a rule creator module for creating a rule for executing the plurality of power profiles and storing the rule in the memory, each rule having a criterion based on a device parameter; a rule configurator module for configuring the rule in the memory; a rule monitoring module for monitoring the device parameter to determine if the criterion in the rule used to manager power of the portable device is matched; and a power profile executor module for executing one of the plurality of power profiles if the criterion in the rule is matched.

BRIEF DESCRIPTION OF THE DRAWINGS

These and other features of the invention will become more apparent from the following description in which reference is made to the appended drawings wherein:

FIG. 9 shows a set of rules in according with an embodiment of the present invention;

FIG. 10 shows an exemplary set of rules corresponding to the embodiment shown in FIGS. 4 and 6; and FIG. 11 shows an exemplary set of rules corresponding to the embodiment shown in FIG. 5.

DETAILED DESCRIPTION

Figure 1:
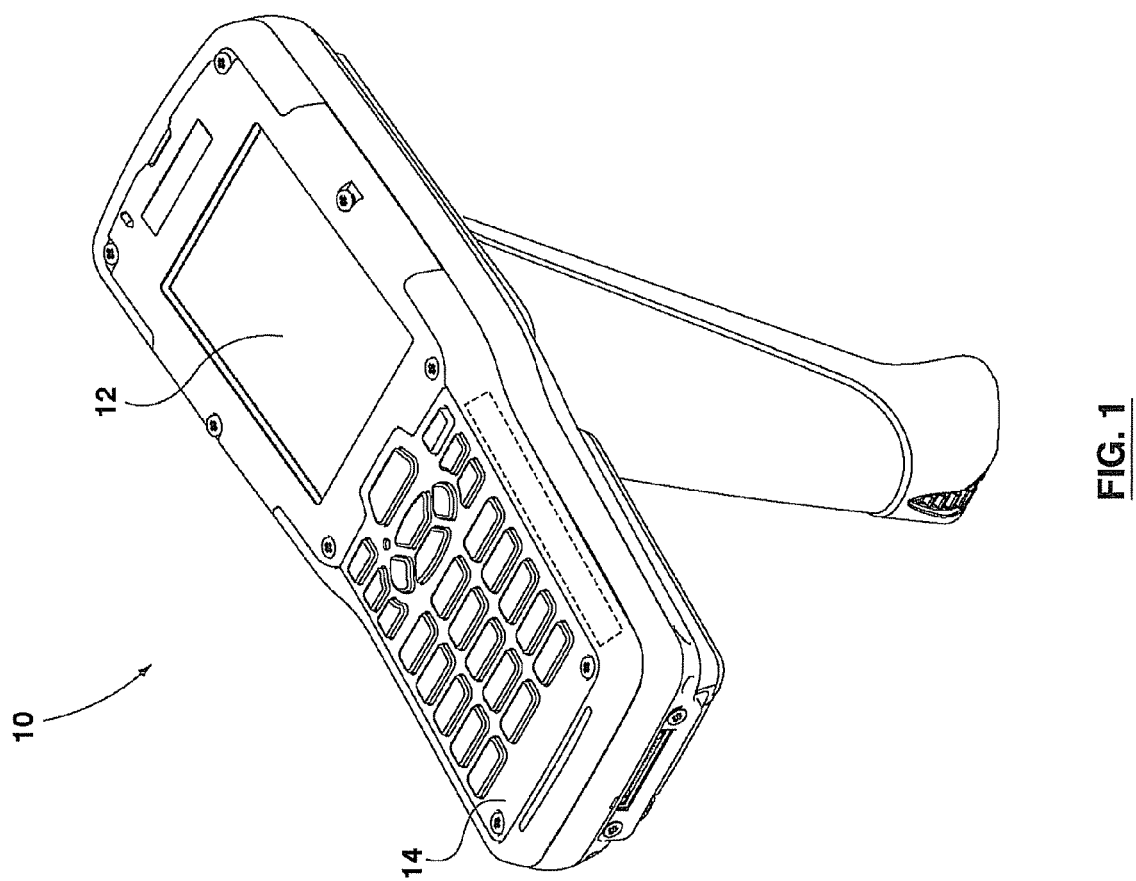
FIG. 1 shows a top perspective view of a portable device incorporating an embodiment of the present invention.
Figure 2:
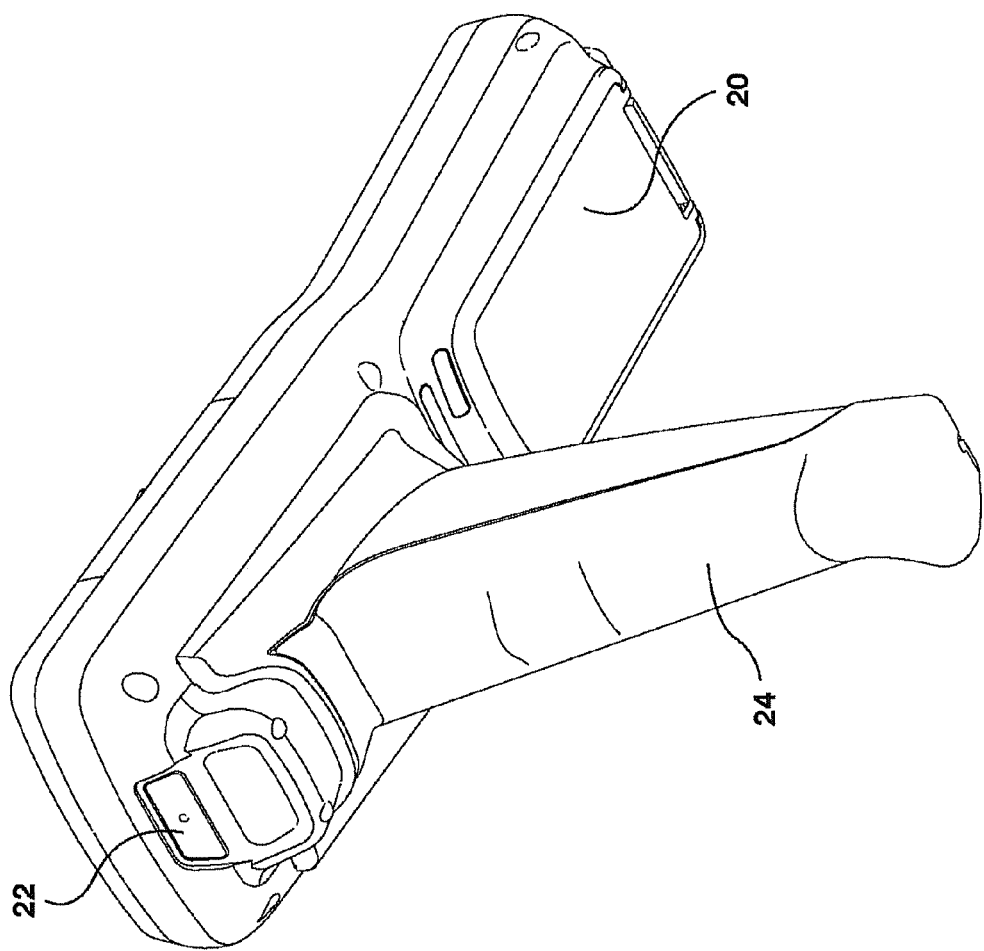
FIG. 2 shows a bottom perspective view of a portable device incorporating an embodiment of the present invention.

Referring to FIGS. 1 and 2, a portable device 10 incorporating an embodiment of the present invention is shown. The portable device 10 may include a display 12, a keypad 14 and battery 20. Optionally, the portable device 10 may include scanner 22 and handle 24 where necessary. The portable device 10 may also include other device components (not shown). For example, the device 10 may include networking protocols such as Wi-Fi™ and Bluetooth™, telecommunication protocols such as GSM (Global System for Mobile Communications) and CDMA (Code Division Multiple Access), and other features such as GPS (Global Positioning System) and RFID (Radio-frequency Identification).

Figure 3:
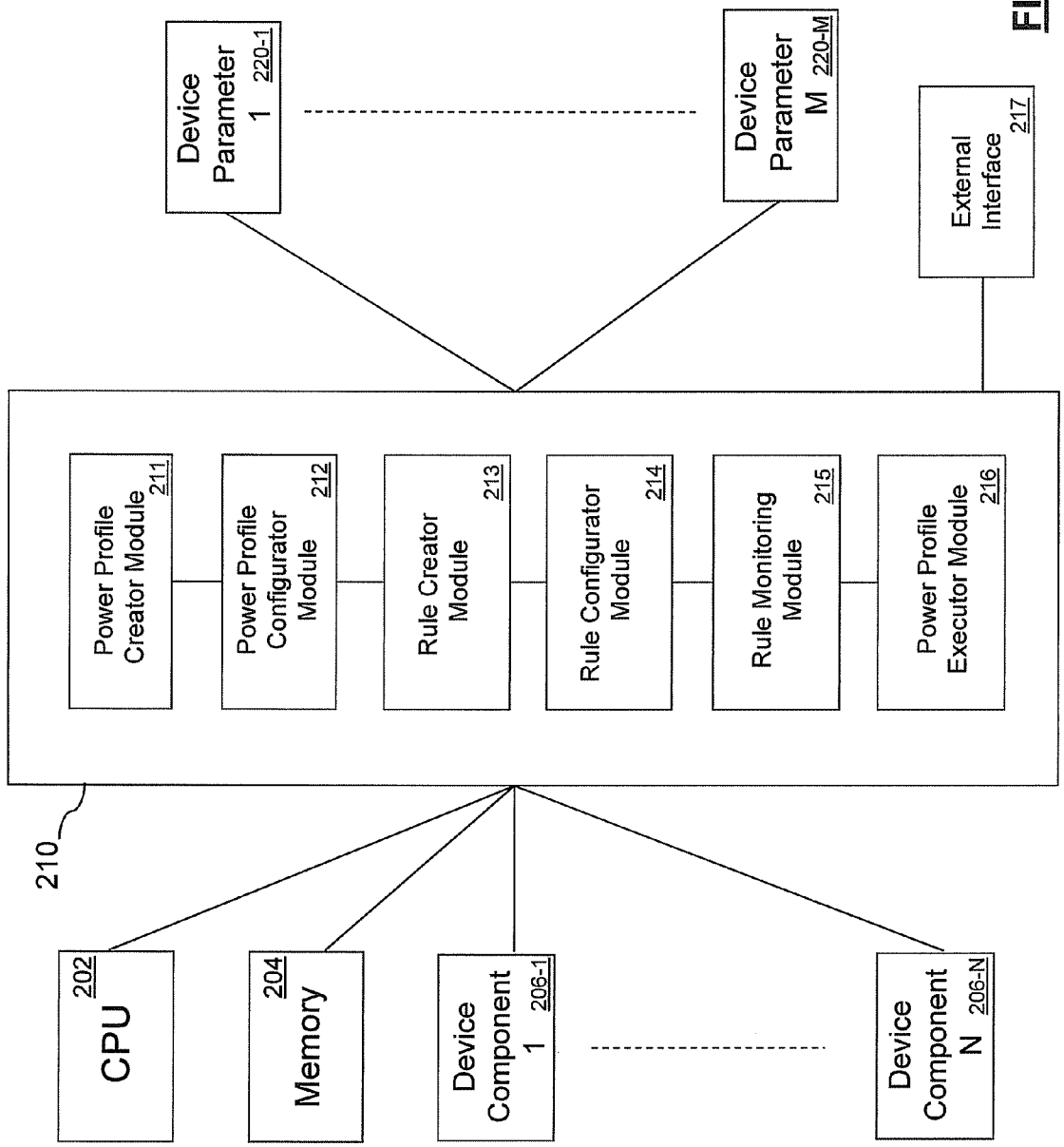
FIG. 3 shows a block diagram of an architecture of the embodiment of the present invention incorporated in the portable device as shown in FIG. 1.

The portable device 10 relies on battery 20 to power all features embodied in the device. To prolong battery life, the device has a system for managing the power of the portable device 10. Referring to FIG. 3, a block diagram of the internal architecture of an embodiment of portable device 200 (analogous to portable device 10 of FIG. 1) is shown. The portable device 200 includes a plurality of device components, including a processor 202, a memory 204, and device component 1 (i.e. 206-1) to component N (i.e. 206-N). The portable device 200 also has at least one device parameter 220-1. For example, the device parameter 220-1 may be the location of the device 10 provided by a device component such as a GPS. The portable device 200 may include more than one device parameter (i.e. 220-1 to 220-M). Coupled to these components is the power management system 210, which includes: a Power Profile Creator module 211, a Power Profile Configurator module 212, a Rule Creator module 213, a Rule Configurator module 214, a Rule Monitoring module 215, and a Power Profile Executor module 216.

Figure 4:
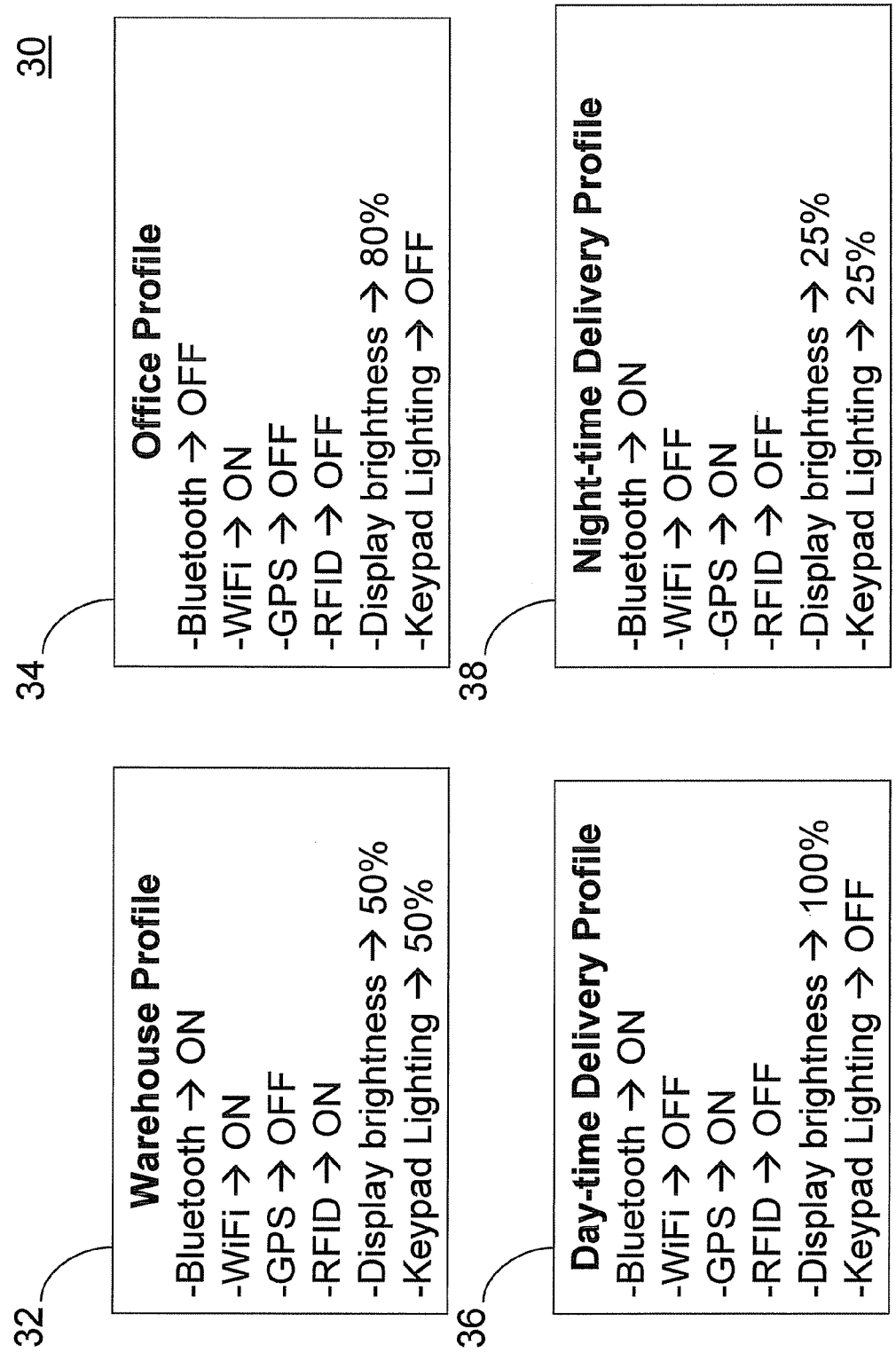
FIG. 4 shows a set of power profiles in accordance with an embodiment of the present invention for use in a commercial-grade portable device.

The Power Profile Creator module 211 handles the creation of power profiles to be used by the power management system 210. Through module 211, the user creates a plurality of power profiles suitable to different environments. For example, the user may create power profiles suitable for different work environments as shown in FIG. 4. Once the power profiles are created and saved in memory 204, the user then uses the Power Profile Configurator module 212 to selectively add the device component(s) (e.g. 206-1 to 206-N) that requires its power setting to be adjusted depending on the different environment settings. An example is shown in FIG. 4 and further described below.

The power management system 210 further includes a Rule Creator module 213. This module handles the creation of rules to be used by the power management system 210 in determining when the plurality of profiles created by the Power Profile Creator module 211 should be executed. This determination is based on criteria/criterion set through the Rule Configurator Module 214. Each rule references at least one criterion that is based on the device parameter(s) (i.e. 220-1 to 220-M). For example, a rule may be based on the location of the device. Thus, the rule may have a criterion based on the location of the device (which may be provided by a device component such as a GPS) to determine which power profile would be suitable for that location. An exemplary set of rules are shown in FIG. 9 and further described below.

With at least one rule in saved in memory, the Rule Monitoring module 215 monitors the device parameter(s) (i.e. 220-1 to 220-M) to determine if the criterion/criteria in the rule(s) is matched. If a match is detected, the Power Profile Executor module 216 executes the corresponding power profile to control the plurality of device components, which may be the processor 202, the memory 204, or any other components 206-1 to 206-N, or a combination thereof.

Although in this particular embodiment, the modules 211-216 are shown as separate modules, other embodiments of the invention may combine some of the modules into one. For example, in another embodiment of the present invention, the Power Profile Creator module 211 and the Power Profile Configurator module 212 may be the same module. In yet another embodiment of the present invention, the Rule Creator module 213 and the Rule Configurator module 214 may be the same module. Alternatively, a power profile manager may handle the functions of the Rule Monitoring module 215 and the Power Profile Executor module 216.

The power management system 210 may also include an external interface 217 to allow each functions of the power management system 210 to be controllable by an external entity. For example, the external interface 217 may be an application programming interface (API), which would allow an administrator or an external system (e.g. third party application) to control the power management system 210. In another embodiment, the external interface 217 may be a user interface.

Now referring to FIG. 4, a plurality of power profiles 30 is shown in accordance with an embodiment of the present invention. The portable device 10, which is a commercial grade portable device, has power profiles 32, 34, 36 and 38 to help manage power consumption during use. Each power profile in 30 is tailored to different needs of a user depending on the work condition. In Warehouse Profile 32, the user is in a warehouse where lighting conditions may be poor. Furthermore, the user may require access to information located on his/her computer or a remote database, and he/she may also require hands-free access to the device since his/her hands may be occupied. Thus, the power settings laid out in Warehouse Profile 32 may be appropriate. In Office Profile 34, the user is presumably in front of the computer and thus, limited interaction with the portable device 10 is required. Thus, the power settings laid out in Office Profile 34 may be adequate. The user may also create two distinct delivery profiles as in Day-time Delivery Profile 36 and Night-time Delivery Profile 38. Although in this particular embodiment, each power profile contains identical device components, a user is not restricted from varying the number of components referenced in each power profile. Once the profiles are created, the device can choose the appropriate power profile accordingly.

Figure 5:
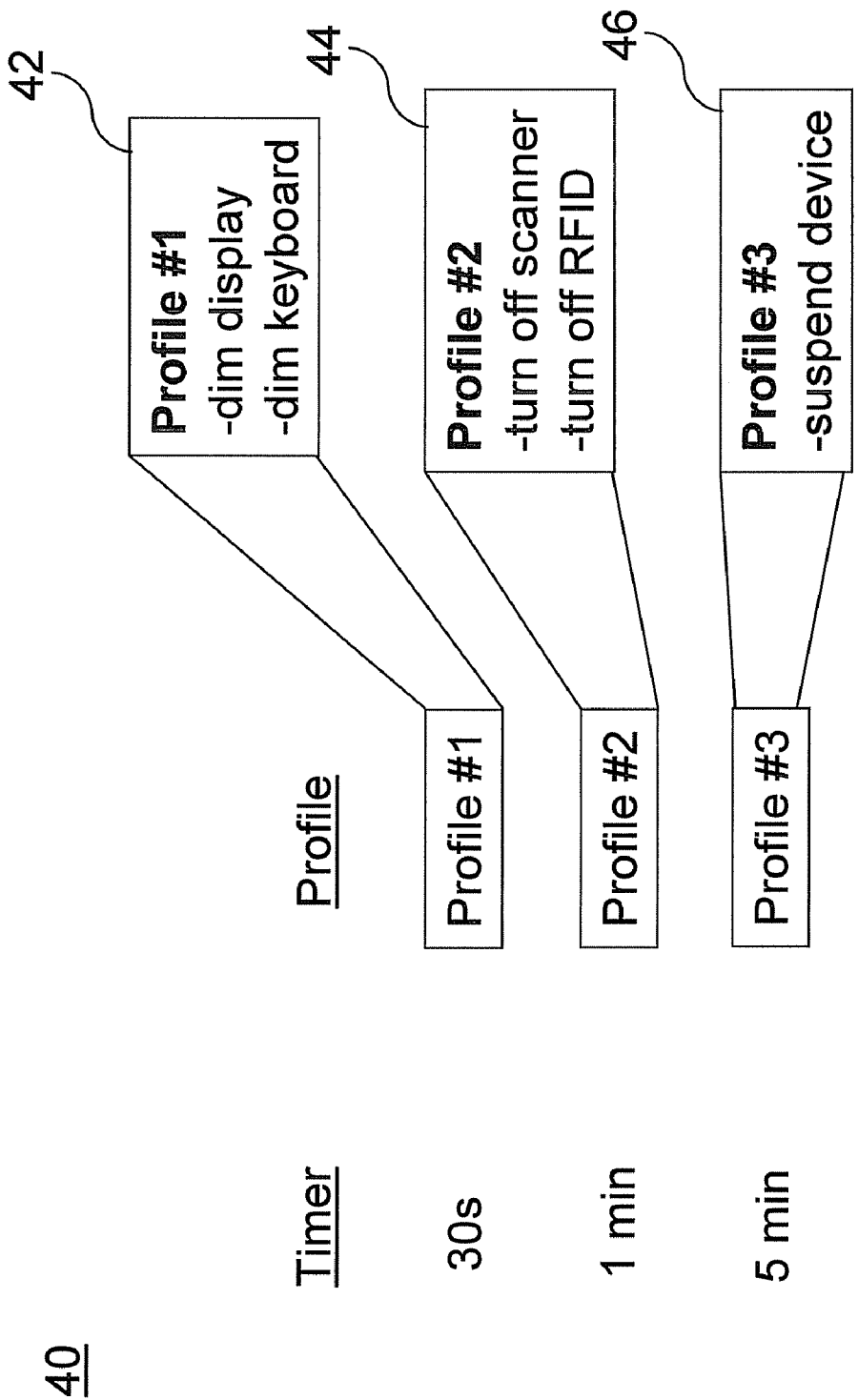
FIG. 5 shows an embodiment of the present invention where the power management is based on a timer.

Alternatively, the user may wish to gradually power down the portable device 10 when the device is inactive. Referring to FIG. 5, three power profiles 42, 44 and 46 are created. Each power profile builds on the previous one to selectively shut off unnecessary components, ultimately suspending the device after 5 minutes of inactivity. Power management 40 is an embodiment of the present invention where the switching between the plurality of power profiles 42, 44 and 46 is based on a timer.

Figure 6:
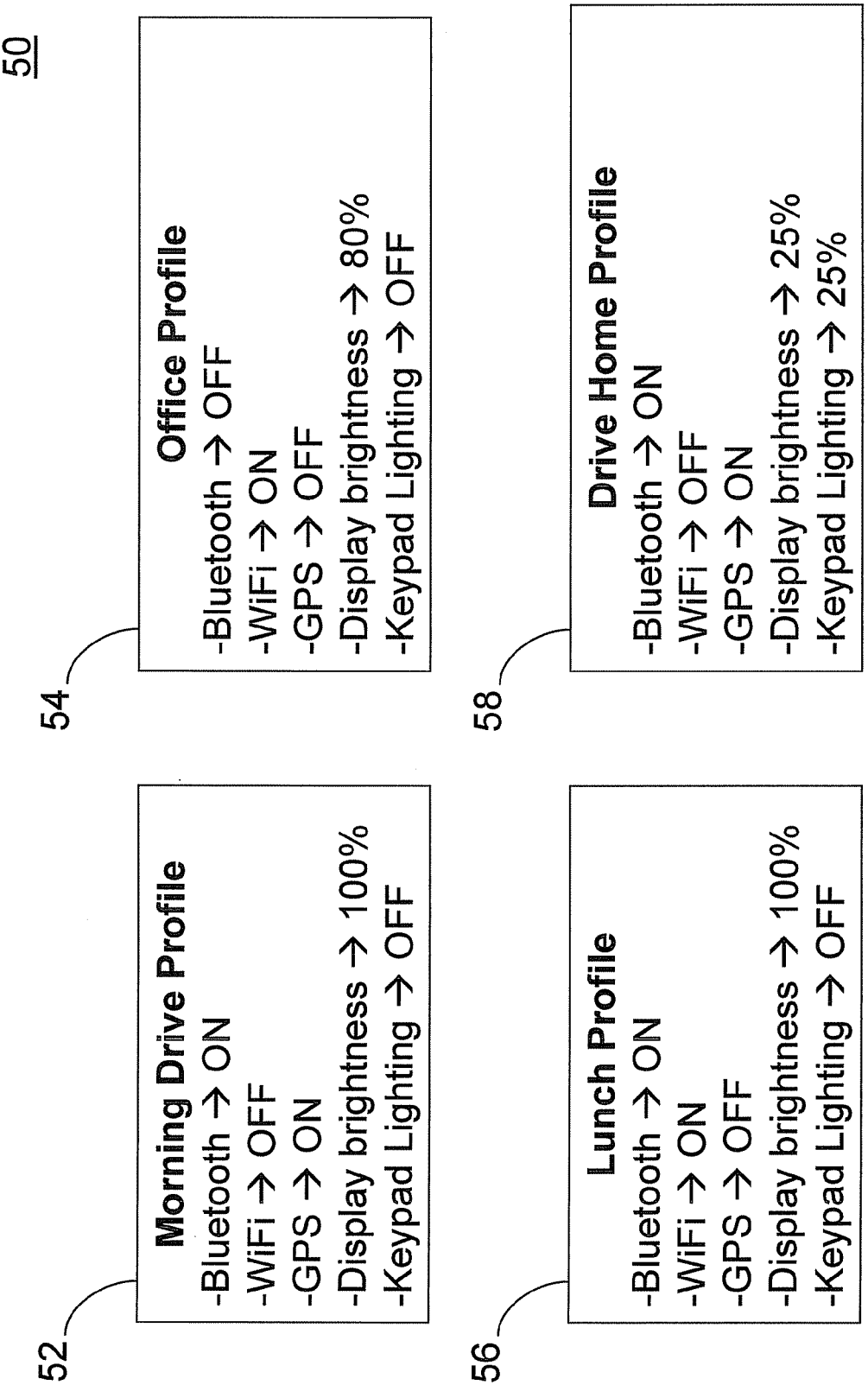
FIG. 6 shows a set of power profiles in accordance with an embodiment of the present invention for use in a consumer portable device.
Figure 7:
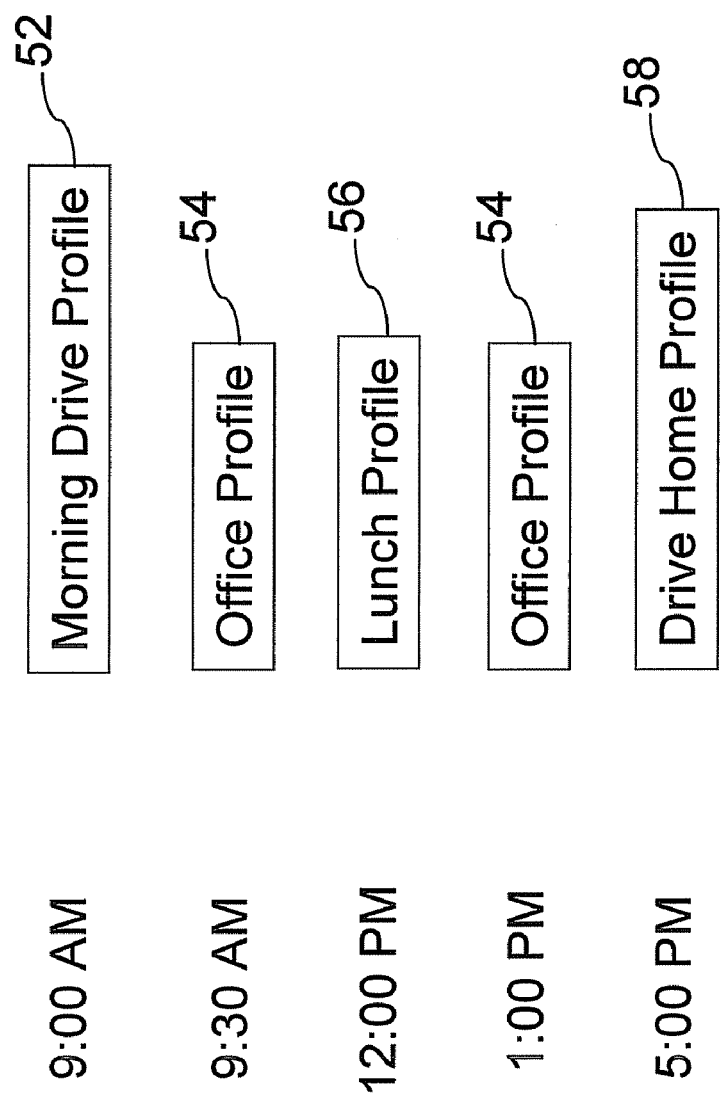
FIG. 7 shows an embodiment of the present invention where the power management is based on time-of-day.

In another embodiment of the present invention, the power management can be used in consumer devices to maximize power efficiency. FIG. 6 shows a plurality of power profiles 50 suitable for a user with a smartphone. The user may set up a Morning Drive Profile 52 to facilitate the use of the portable device 10 while driving. As the user pulls into the office, the portable device 10 activates the Office Profile 54 to adjust to the lighting conditions of the office building and to take advantage of the wireless Internet connection in the office. During lunch, the device 10 switches to the Lunch Profile 56 to facilitate hands-free communication as the user enjoys his/her lunch and to permit web browsing by maximing screen brightness. When it is time to drive home after work, the device 10 switches to the Drive Home Profile 58, which is similar to the Morning Drive Profile 52 except that the device 10 adjusts to night conditions. FIG. 7 shows an embodiment of the present invention 60 where power profiles 52, 54, 56, and 58 of FIG. 6 are selected based on the time-of-day.

Figure 8:
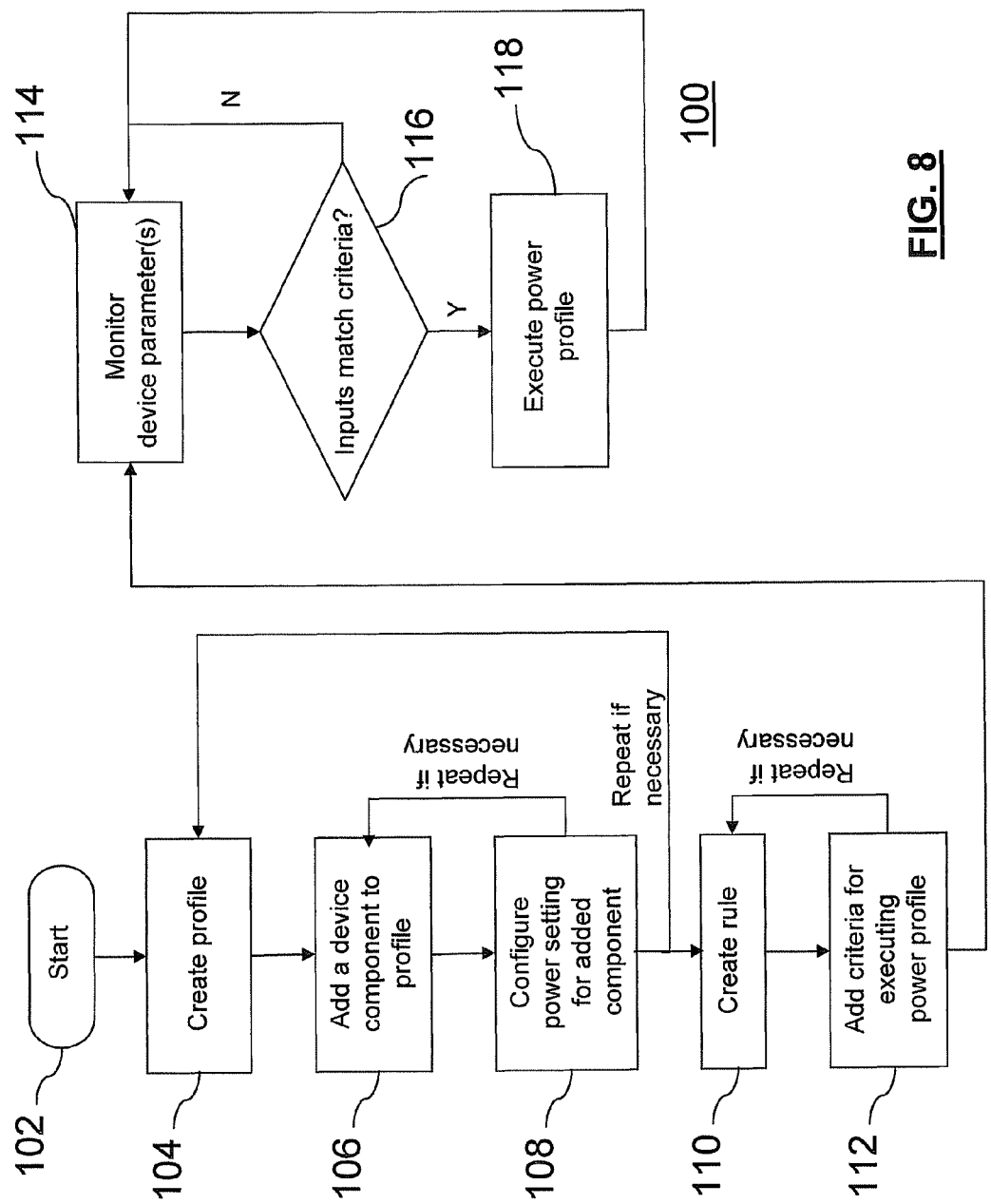
FIG. 8 shows a process of the power management in accordance with an embodiment of the present invention.

Turning to FIG. 8, an embodiment of the process of managing power of a portable device 10 is shown. The process 100 starts (i.e. 102) by requiring the user to create power profiles (i.e. 104). The user creates a power profile and usually designates a specific name to the power profile. If not, a default name can be assigned. The created power profile is then populated with device components (i.e. 106), such as a display (e.g. 12), a keypad (e.g. 14), a scanner (e.g. 22) and other internal device components. Each device component is configured to the desired power setting (i.e. 108). For example, the power profile may dictate that the display brightness is at 50% and the scanner is OFF. Once all the power profiles have been created and populated with device components that have their power settings configured, the user proceeds to creating rules (i.e. 110). The rules contain criteria (or criterion) that define the "when, where, and what" of the power management: e.g. When is the profile switched? Where is the profile switching required? What profile should the device be in? This is defined in block 112 of FIG. 8. Once all the profiles and rules are created, the power management system starts to monitor the device parameter(s) of the portable device (i.e. 114). The device parameter(s) may consist of such parameter(s) as GPS coordinates, IP subnets, RFID tag data, time-of-day, date, timer, or docking/cradle status. Where the monitored parameter(s) matches the criteria (or criterion) established in one of the rules (i.e. 116), the matched rule and the corresponding power profile is executed (i.e. 118). The system then continues to monitor until another rule is matched. In another embodiment of the present invention, the processes 114, 116 and 118 may be carried out by a profile manager.

As described above, where the power management system 210 (see FIG. 3) provides an external interface 217, the entire process 100 in FIG. 8 may be controllable by an external entity. For example, the external interface 217 may be an application programming interface that allows an administrator or an external system (e.g. third-party software) to control the process 100.

Now referring to FIG. 9, an example of rules 70 that a user may create during the rules creation stage (i.e. 110 and 112) is shown. In FIG. 9, Rule #1 of GPS Rules 72 has a range, defined by coordinates 1 and coordinates 2, that must be matched before the "defined profile 1" is executed. The device 10 may include other ways to determine its location, for example through RFID, Wi-Fi™ and docking mechanism, which may be used to create rules such as those disclosed in 74, 76 and 78.

As a further example, rules 80, 82, 84 and 86 are shown in FIGS. 10 and 11 that correspond to FIGS. 5 and 7. Rule 80 is a rule based on time-of-day corresponding to the power profiles 52, 54, 56 and 58 of FIG. 6. As shown, the times reflect an approximation of when the user would be driving to work (i.e. Rule #1), when the user would be at the office (i.e. Rule #2), when the user would be at lunch (i.e. Rule #3) and when the user would be driving home (i.e. Rule #4). Alternatively, the power profiles 52, 54, 56 and 58 may be based on the location of the device and the time-of-day. By creating criteria that take into consideration several device inputs, a more accurate set of rules may be created, such as those exemplified in rule 82. For example, rule #1 of the Monday-to-Friday Rules 82 considers not only the GPS location of the device but also the time-of-day to determine when the Morning Drive Profile 52 should be executed. A similar exemplary rule implementation for power profiles 32, 34, 36 and 38 are shown in the Warehouse Scanner 1 Rules 84 of FIG. 11. FIG. 11 further shows Inactivity Rules 86 which is an exemplary set of rules corresponding to FIG. 5.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

One or more currently preferred embodiments have been described by way of example. It will be apparent to persons skilled in the art that a number of variations and modifications can be made without departing from the scope of the invention as defined in the claims.

What is claimed is:

1. A method for managing power of a portable device, the portable device having a plurality of device components, including a processor and a memory, each device component having a controllable power setting, the method comprising:
    creating a plurality of power profiles in the memory, each power profile referencing the plurality of device components;
    configuring the controllable power setting of each device component referenced in each power profile;
    creating a rule having a criterion for executing the plurality of power profiles, the criterion based on a device parameter;
    configuring the rule for executing the plurality of power profiles;
    monitoring the device parameter to determine if the criterion in the rule used to manage power of the portable device is matched; and
    executing on the processor the plurality of power profiles if the criterion in the rule is matched;
    wherein the creating of the plurality of power profiles, the configuring of the controllable power settings, the creating of the rule and the configuring of the rule are controllable, through an external interface, by an external entity.

2. The method according to claim 1, wherein the device parameter is based on time, date, or location of the portable device, or a combination thereof.

3. The method according to claim 2, wherein the location of the portable device is determined by a Global Positioning System (GPS), a wireless local area network (WLAN), a radio-frequency identification (RFID), or a docking or cradle mechanism, or a combination thereof.

4. The method of claim 1 wherein the external interface is an application programming interface (API).

5. The method of claim 1 wherein the external entity is an administration server.

6. The method of claim 1 wherein the external entity is a third party software.

7. The method of claim 1 wherein the plurality of power profiles includes a plurality of power-down profiles, and wherein the rule is for powering down the portable device through successive execution of the power-down profiles.

8. The method of claim 7 wherein the criterion is a timer.

9. A system for managing power of a portable device, the portable device having a plurality of device components, including a processor and a memory, each device component having a controllable power setting, the system comprising:
   a power profile creator module for creating a plurality of power profiles and storing the plurality of power profiles in the memory, each power profile referencing the plurality of device components;
   a power profile configurator module for configuring the controllable power setting of each device component referenced in each power profile;
   a rule creator module for creating a rule for executing the plurality of power profiles and storing the rule in the memory, each rule having a criterion based on a device parameter;
   a rule configurator module for configuring the rule in the memory;
   a rule monitoring module for monitoring the device parameter to determine if the criterion in the rule used to manager power of the portable device is matched; and
   a power profile executor module for executing one of the plurality of power profiles if the criterion in the rule is matched; and
   an external interface for controlling the power profile creator module, the power profile configurator module, the rule creator module and the rule configurator module by an external entity.

10. The system according to claim 9, wherein the external interface is an application programming interface.

11. The system according to claim 9, wherein the device parameter is based on time, date, or location of the portable device, or a combination thereof.

12. The system according to claim 11, wherein the location of the portable device is determined by a Global Positioning System (GPS), a wireless local area network (WLAN), a radio-frequency identification (RFID), or a docking or cradle mechanism, or a combination thereof.

13. The system of claim 9 wherein the external entity is an administration server.

14. The system of claim 9 wherein the external entity is a third party software.

15. The system of claim 9 wherein the plurality of power profiles includes a plurality of power-down profiles, and wherein the rule is for powering down the portable device through successive execution of the power-down profiles.

16. The system of claim 15 wherein the criterion is a timer.

17. A non-transitory computer-readable storage medium storing instructions or statements for use in the execution in a computer of a method of managing power of a portable device, the portable device having a plurality of device components, including a processor and a memory, each device component having a controllable power setting, the method comprising:
   creating a plurality of power profiles in the memory, each power profile referencing the plurality of device components;
   configuring the controllable power setting of each device component referenced in each power profile;
   defining a rule having a criterion for executing the plurality of power profiles, the criterion based on a device parameter;
   monitoring the device parameter to determine if the criterion in the rule used to manage power of the portable device is matched; and
   executing on the processor the plurality of power profiles if the criterion in the rule is matched;
   wherein the creating of the plurality of power profiles, the configuring of the controllable power settings, the creating of the rule and the configuring of the rule are controllable, through an external interface, by an external entity.

18. The method according to claim 17, wherein the device parameter is based on time, date, or location of the portable device, or a combination thereof.

19. The method according to claim 18, wherein the location of the portable device is determined by a Global Positioning System (GPS), a wireless local area network (WLAN), a radio-frequency identification (RFID), or a docking or cradle mechanism, or a combination thereof.

20. The method of claim 17 wherein the external interface is an application programming interface (API).

21. The method of claim 17 wherein the external entity is an administration server.

22. The method of claim 17 wherein the external entity is a third party software.

23. The method of claim 17 wherein the plurality of power profiles includes a plurality of power-down profiles, and wherein the rule is for powering down the portable device through successive execution of the power-down profiles.

24. The method of claim 23 wherein the criterion is a timer.

* * * * *